United States Patent
Roberts et al.

(10) Patent No.: US 8,864,557 B1
(45) Date of Patent: Oct. 21, 2014

(54) MULTIPLE-BIRD POULTRY SHACKLE AND RELATED METHODS

(71) Applicant: Perdue Foods LLC, Salisbury, MD (US)

(72) Inventors: Dave Roberts, Salisbury, MD (US);
Lonnie Bailey, Salisbury, MD (US)

(73) Assignee: Perdue Foods LLC, Salisbury, MD (US)

( * ) Notice: Subject to any disclaimer, the term of this patent is extended or adjusted under 35 U.S.C. 154(b) by 0 days.

(21) Appl. No.: 14/175,831

(22) Filed: Feb. 7, 2014

(51) Int. Cl.
*A22C 25/08* (2006.01)
*A22C 21/00* (2006.01)

(52) U.S. Cl.
CPC ......... *A22C 21/0007* (2013.01); *A22C 21/0053* (2013.01)
USPC ....................................................... 452/183

(58) Field of Classification Search
CPC ............. A22C 21/0007; A22C 15/005; A22C 21/0053; A22C 21/06; A47J 43/18; A47J 36/22; A47J 36/26; A47J 37/045; A47J 37/0694; A22B 7/002; A22B 5/0094; A47B 96/00; A47F 3/001; A47F 5/01; A47F 5/02
USPC ......... 452/179, 180, 182, 183, 185, 187, 189, 452/192, 188
See application file for complete search history.

(56) References Cited

U.S. PATENT DOCUMENTS

| | | | | | |
|---|---|---|---|---|---|
| 1,516,728 | A | * | 11/1924 | Hill | 426/235 |
| 2,639,463 | A | * | 5/1953 | Zebarth | 452/188 |
| 3,011,650 | A | * | 12/1961 | Engelhorn et al. | 211/117 |
| 4,283,813 | A | * | 8/1981 | House | 452/106 |
| 4,401,018 | A | * | 8/1983 | Berry | 99/420 |
| 5,442,999 | A | * | 8/1995 | Meister | 99/426 |
| 5,785,185 | A | * | 7/1998 | Klebba | 211/37 |
| 5,875,738 | A | * | 3/1999 | Hazenbroek et al. | 119/716 |
| 6,056,613 | A | * | 5/2000 | Pike | 441/129 |
| 6,213,864 | B1 | * | 4/2001 | Griffiths et al. | 452/173 |
| 6,386,379 | B1 | * | 5/2002 | Battaglia | 211/106 |
| 7,770,741 | B2 | * | 8/2010 | Oliver | 211/85.11 |
| 7,942,278 | B2 | * | 5/2011 | Martin et al. | 211/125 |

* cited by examiner

*Primary Examiner* — Richard Price, Jr.
(74) *Attorney, Agent, or Firm* — Venable LLP; Steven J. Schwarz

(57) ABSTRACT

A multi-bird poultry shackle includes a stanchion having a connection point adapted to couple to a conveyor; a first shackle coupled to the stanchion, the first shackle having a first pair of leg loops adapted to hold the legs of a first bird, and a second pair of leg loops adapted to hold the legs of a second bird; a second shackle coupled to the stanchion below the first shackle, the second shackle having a third pair of leg loops adapted to hold the legs of a third bird, and a fourth pair of leg loops adapted to hold the legs of a fourth bird; and a third shackle coupled to the stanchion below the second shackle, the third shackle having a fifth pair of leg loops adapted to hold the legs of a fifth bird, and a sixth pair of leg loops adapted to hold the legs of a sixth bird. A method of conveying poultry carcasses is also described.

17 Claims, 5 Drawing Sheets ly occupying about twenty inches vertically. With conventional arrangements, it is only possible to hold about two birds per linear foot of conveyor track and chain.

MULTIPLE-BIRD POULTRY SHACKLE AND RELATED METHODS

TECHNICAL FIELD

This patent application relates generally to shackles for holding birds or other food products during processing, such as chickens and turkeys. More specifically, the present application relates to a multi-bird shackle used during a whole bird chilling process.

BACKGROUND

In conventional poultry chilling processes, shackles are used that hold only one whole bird. The shackles convey the birds through a refrigerated space, e.g., an air-chilled space, until the birds reach government mandated temperatures. Subsequently, the birds are unloaded from the shackles and taken away for further processing.

With reference to FIG. 1, a conventional shackle 2 typically includes a connection point 4 for attaching to a conveyor chain 6, and leg loops 8 that secure the legs of the bird 10. The conventional arrangement requires a given amount of space per linear foot of conveyor chain 12 for each individual shackle. This space includes the conveyor track 14, chain 12, and shackle 2. This space also includes the whole bird 10 that hangs from the shackle 2, with the shackle 2 and bird 10 typically occupying about twenty inches vertically. With conventional arrangements, it is only possible to hold about two birds per linear foot of conveyor track and chain.

Conventional systems require a large amount of conveyor track and chain infrastructure, and as a result, building space, to chill a whole bird down to government standards. This in turn requires a large amount of capital outlay for tracks, chains, drives, and building space, as well as large operating and maintenance expenses to operate and maintain the systems. Additionally, in order to fit as many birds into a given area as possible, conventional systems often use a sharp turn radius, e.g., of 180 degrees. This can also lead to increased power requirements, in order to drive the chain and shackles around the system.

SUMMARY

According to an embodiment, a multi-bird poultry shackle comprises: a stanchion having a connection point adapted to couple to a conveyor; a first shackle coupled to the stanchion, the first shackle comprising a first pair of leg loops adapted to hold the legs of a first bird, and a second pair of leg loops adapted to hold the legs of a second bird; a second shackle coupled to the stanchion below the first shackle, the second shackle comprising a third pair of leg loops adapted to hold the legs of a third bird, and a fourth pair of leg loops adapted to hold the legs of a fourth bird; and a third shackle coupled to the stanchion below the second shackle, the third shackle comprising a fifth pair of leg loops adapted to hold the legs of a fifth bird, and a sixth pair of leg loops adapted to hold the legs of a sixth bird.

According to another embodiment, a method of conveying poultry carcasses comprises: providing a conveyor including a plurality of multi-bird shackles, each multi-bird shackle including a first shackle comprising a first pair of leg loops and a second pair of leg loops, a second shackle located below the first shackle, the second shackle including a third pair of leg loops and a fourth pair of leg loops, and a third shackle including a fifth pair of leg loops and a sixth pair of leg loops; securing the feet of a first bird in the first pair of leg loops; securing the feet of a second bird in the second pair of leg loops, the second bird located on the opposite side of the first shackle from the first bird; securing the feet of a third bird in the third pair of leg loops, the third bird located below the first bird; securing the feet of a fourth bird in the fourth pair of leg loops, the fourth bird located on the opposite side of the second shackle from the third bird, securing the feet of a fifth bird in the fifth pair of leg loops, the fifth bird located below the third bird; securing the feet of a sixth bird in the sixth pair of leg loops, the sixth bird located on the opposite side of the third shackle from the fifth bird; and circulating the conveyor.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Various embodiments of the invention are discussed in detail below. While specific embodiments are discussed, it should be understood that this is done for illustration purposes only. A person skilled in the relevant art will recognize that other components and configurations can be used without departing from the spirit and scope of the invention.

The present invention relates to a multi-bird poultry shackle that can be used, for example, to convey whole bird carcasses through a refrigerated space to chill the carcasses to government mandated temperatures. Additionally or alternatively, the multi-bird poultry shackle can be used to convey birds through other poultry processing stages. According to embodiments, the multi-bird shackle can be used to convey other food products, such as hams or rabbits. The multi-bird shackle can have attachment points for birds (or other food products) distributed around the periphery of the multi-bird shackle, and can also have multiple tiers of such attachment points. Accordingly, significantly more birds can be conveyed by a given location on the conveyor, as compared to prior art arrangements.

Figure 1:
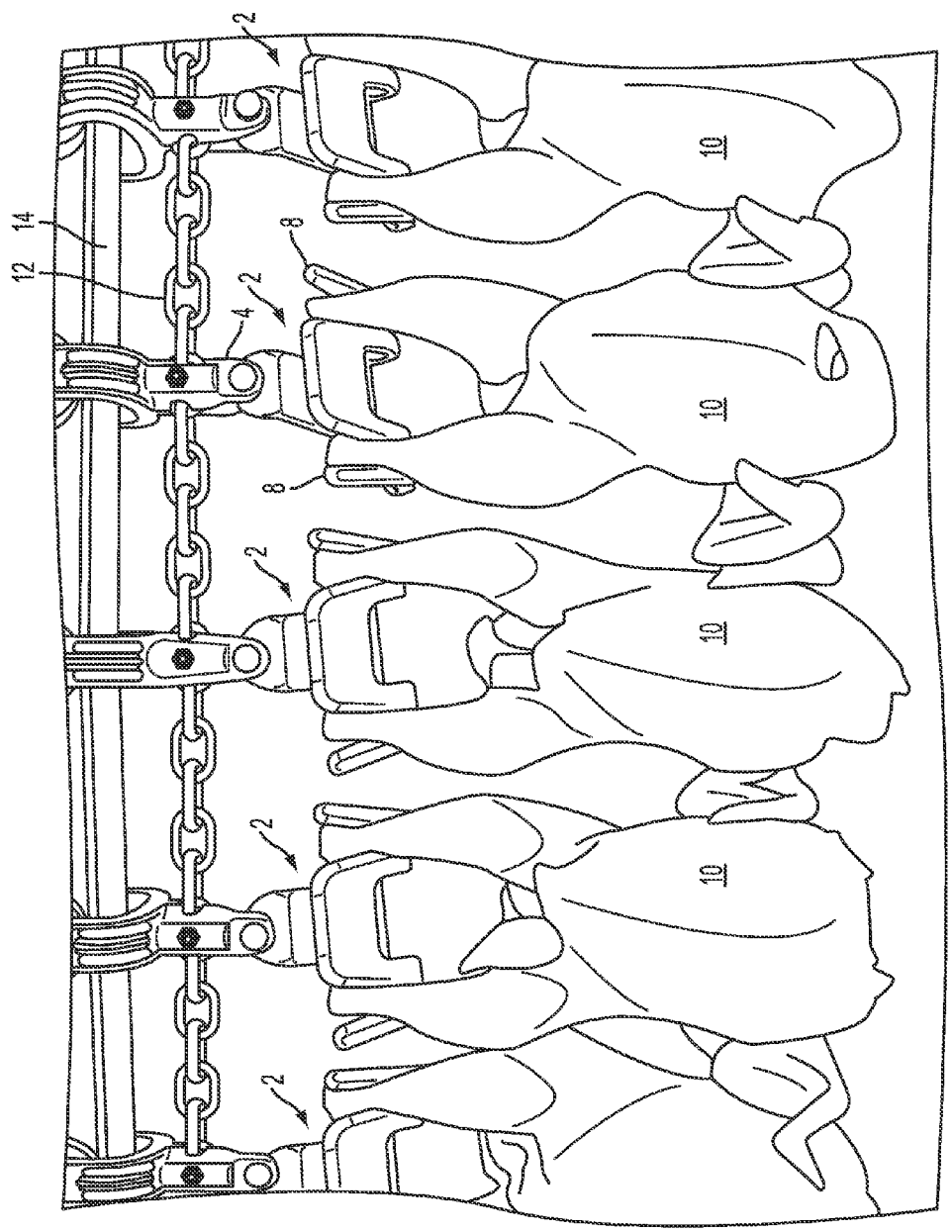
FIG. 1 is a perspective view of prior art poultry shackles located side-by-side on a conveyor. A whole bird is shown hanging from each of the shackles.
Figure 2:
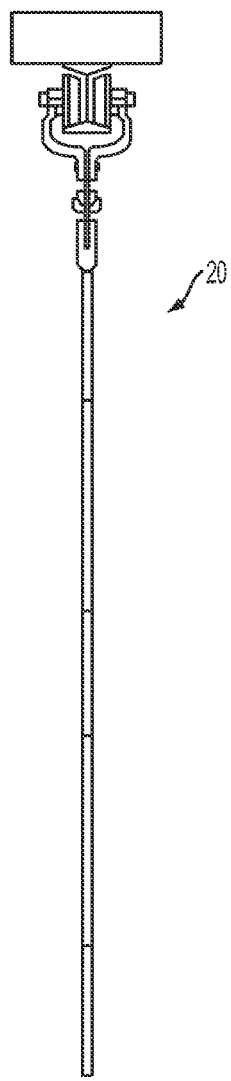
FIG. 2 depicts a side view of a conveyor having a multi-bird poultry shackle according to the present invention.
Figure 3:
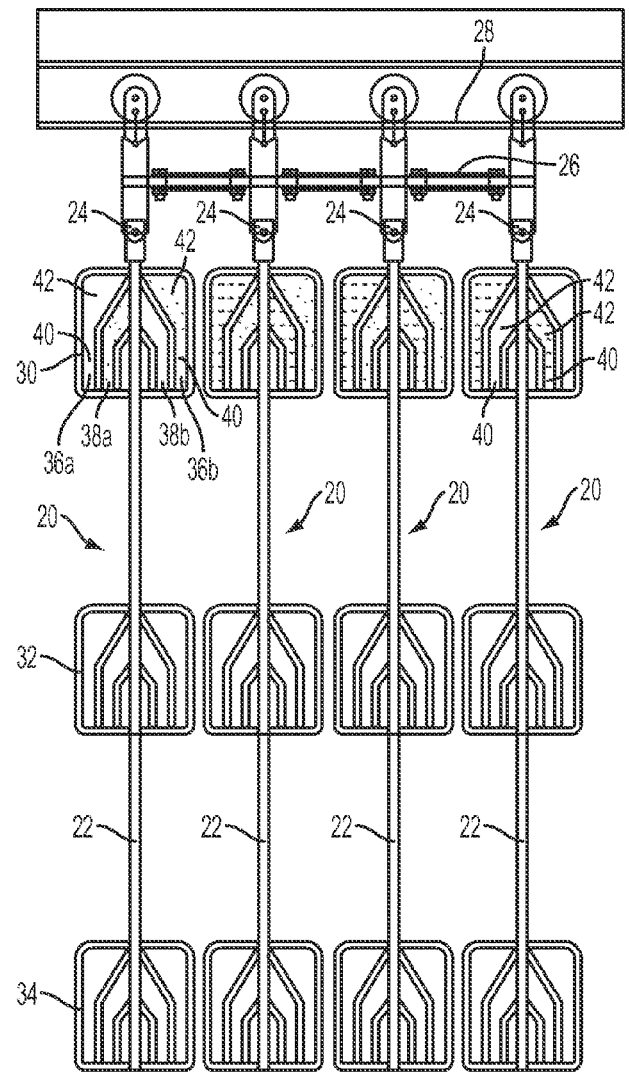
FIG. 3 depicts a front view of the conveyor of FIG. 2, depicting four multi-bird shackles side-by-side on the conveyor.

Referring to FIG. 2, an embodiment of the multi-bird shackle is shown. FIG. 3 shows a plurality of the shackles located side-by-side on a conveyor. Each multi-bird shackle 20 can include a stanchion 22 having a connection point 24 adapted to couple the shackle 20 to a conveyor, e.g., to a conveyor chain 26 and/or conveyor track 28. Any number of known connections or couplings can be used for the connection point 24, and the present invention is not limited to any particular type of connection or coupling.

Referring to FIG. 3, each multi-bird shackle 20 can include a first shackle 30, second shackle 32, and third shackle 34 coupled to the stanchion 22, e.g., formed integrally therewith, or connected thereto using fasteners, bonding, welding, or other techniques known in the art. According to the embodiment shown, the multi-bird shackles 20 can comprise metal structures, e.g., frameworks, formed by welding together metal rods, however, other configurations are possible. The second shackle 32 can be located below the first shackle 30, and the third shackle 34 can be located below the second shackle 32. According to embodiments, more or less than three shackles 30, 32, 34 can be provided on each stanchion 22.

Still referring to FIG. 3, the first shackle 30 can include a first pair of leg loops 36a, 38b adapted to hold the legs of a first bird, e.g., to hold or squeeze the bird's legs with its feet or drumstick knuckles on one side of the shackle 30 and its body on the other side of the shackle 30. The first shackle 30 can also include a second pair of leg loops 38a, 36b adapted to hold the legs of a second bird in a similar manner. According to embodiments, the first pair of leg loops 36a, 38b can hold the first bird on one side of the first shackle 30, and the second pair of leg loops 38a, 36b can hold the second bird on the opposite side of the first shackle 30, such that the birds face one another. According to the embodiment shown, the bird's legs are intended to skip one leg loop on either side of the shackle in an effort to put the greatest possible distance between the legs on both sides of the shackle, and at the same time maintaining uniformity on the bird, however, other arrangements are possible. For example, according to another embodiment, one bird's legs can be placed inside another bird's legs. The second shackle 32 and third shackle can have similar arrangements of pairs of leg loops.

Still referring to FIG. 3, each leg loop 36a, 36b, 38a, 38b, etc., can comprise a pair of adjacent metal rods. Referring to leg loops 36a, 36b, each leg loop can have a lower portion 40 where the distance between the adjacent metal rods ("width") is less than the size of a foot or drumstick knuckles of a bird with which the shackle is intended to be used. Accordingly, the lower portion 40 can hold the bird's leg between the adjacent metal rods, with the foot or drumstick knuckles on one side of the shackle 40 and the bird's body on the other side of the shackle 40. Each leg loop can also have an upper portion 42 with a greater width than the lower portion 40, e.g., greater than the size of the bird's foot or drumstick knuckles. As a result, the bird can be released from the leg loop by lifting the bird above the lower portion 40 into the upper portion 42, and moving the foot or drumstick knuckles laterally through the upper portion 42. According to embodiments intended for use with chicken or turkeys, the lower portion of each leg loop can have a width of between about ¼" and 1½", more specifically, between about ⅜" and about 1¼" depending on bird size, and the upper portion of each leg loop can have a width of between about 1" and about 4" depending on bird size.

Figure 4:
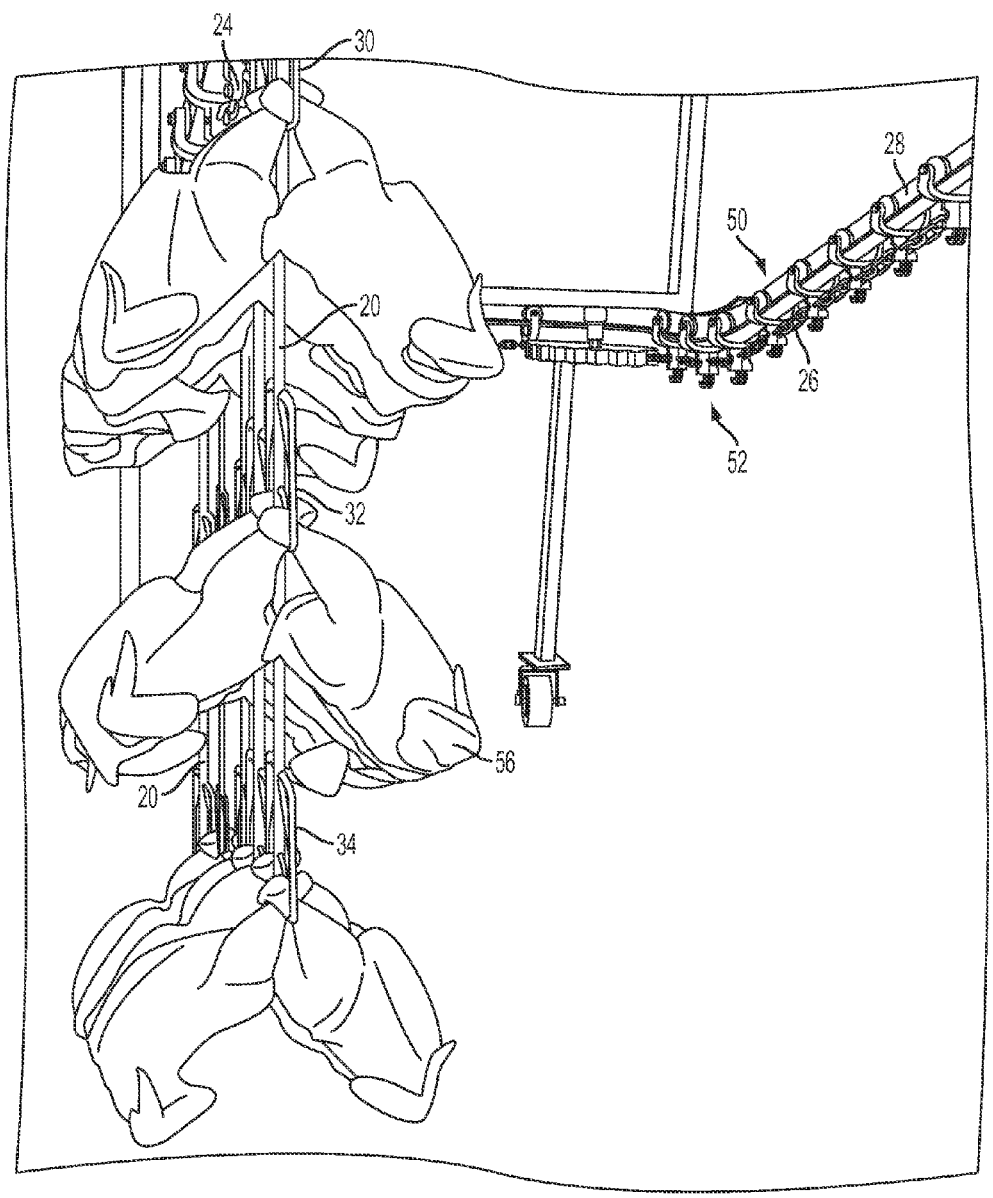
FIG. 4 depicts a perspective view of the conveyor and poultry shackles of FIGS. 2-3, shown holding whole birds.
Figure 5:
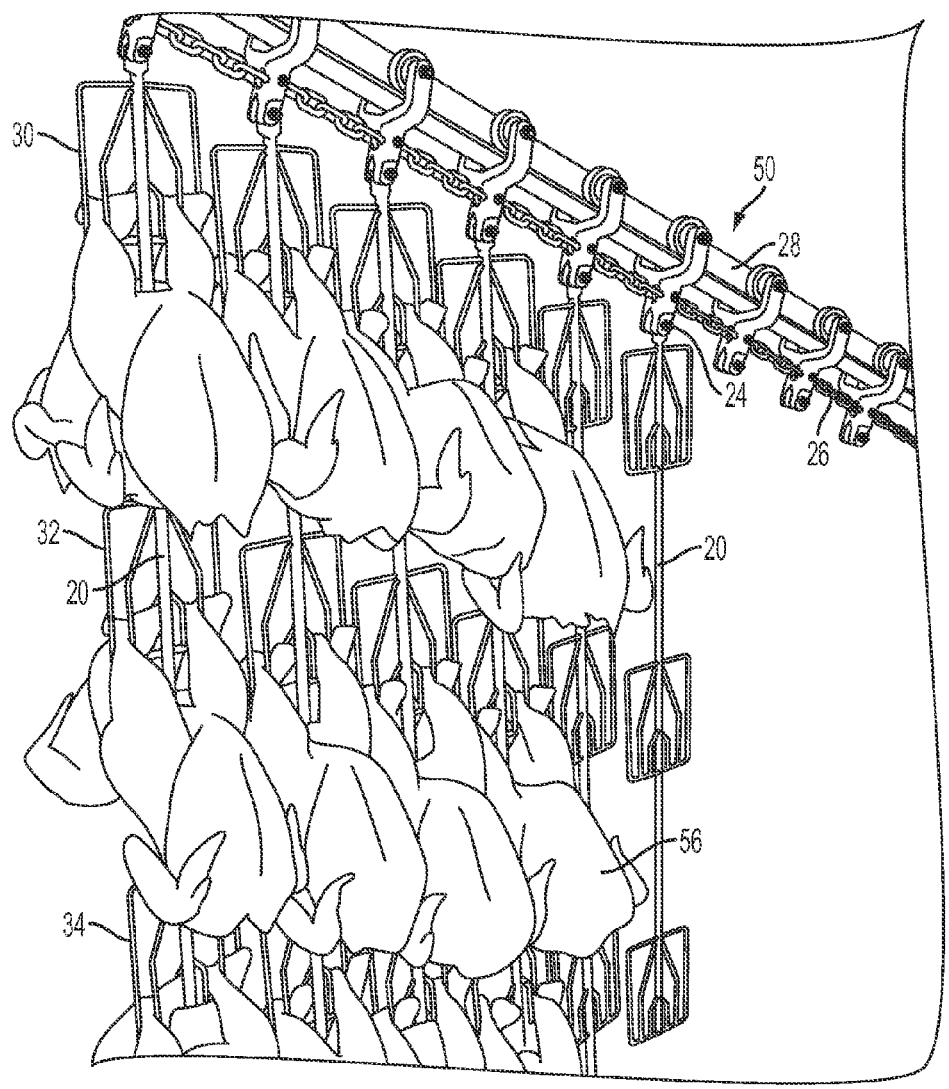
FIG. 5 depicts another perspective view of the conveyor and poultry shackles of FIGS. 2-3, shown holding whole birds.

Referring to FIGS. 4 and 5, the multi-bird shackles 20 can be attached to a conveyor 50 using, for example, the connection points 24. The conveyor chain 26 can circulate the shackles 20 around the conveyor track 28, for example, under the power of one or more electric motors or other drives. FIG. 4 shows multi-bird shackles 20 containing birds 56 on each pair of leg loops on each of the first, second, and third shackles 30, 32, 34. In FIG. 4, the multi-bird shackles 20 are attached to the conveyor chain 26 at approximately six inch centers between adjacent shackle connection points, however, other spacings and other chains are possible. Because birds are more densely concentrated on the conveyor of the present invention, as compared to the prior art, the shackles can be circulated more slowly, for example, on the order of about 4 to about 15 feet per minute, more specifically about 7 to 8 feet per minute, however, other speeds are possible.

FIG. 4 depicts the birds 56 located on both sides of the shackles 20 and stacked above one another, for example, using the first, second and third shackles 30, 32, 34, respectively. Accordingly, in the embodiment shown, a total of six birds can be carried by each multi-bird shackle 20, however, alternative embodiments can carry fewer or more birds per shackle 30, 32, 34 (e.g., have more or less leg loops per shackle) and/or can have additional or fewer shackles stacked horizontally per multi-bird shackle 20. The multi-bird shackle 20 shown can hold six whole birds in an approximately 4.5 foot vertical space versus conventional designs that can only carry one bird in the same vertical space per shackle location. Additionally, conventional designs hold two birds per linear foot of conveyor chain, whereas embodiments according to the present invention can carry about twelve birds per linear foot of conveyor chain. According to embodiments, this can multiply the capability of track and chain conveyor systems for poultry chilling by approximately six times.

Referring to FIG. 4, the conveyor 50 can include one or more turns 52. In order to reduce drag and improve operating efficiency, the turns 52 can be 180 degrees or less, e.g., between about 60 degrees and about 120 degrees. For example, an embodiment can include four turns 52 of approximately 90 degrees, such that the conveyor 50 moves in a substantially square or rectangular path. Additionally or alternatively, one or more of the turns 52 can have a diameter of between about 1 foot and about 2.5 feet, for example, about 2 feet, further reducing drag and increasing efficiency.

Figure 6:
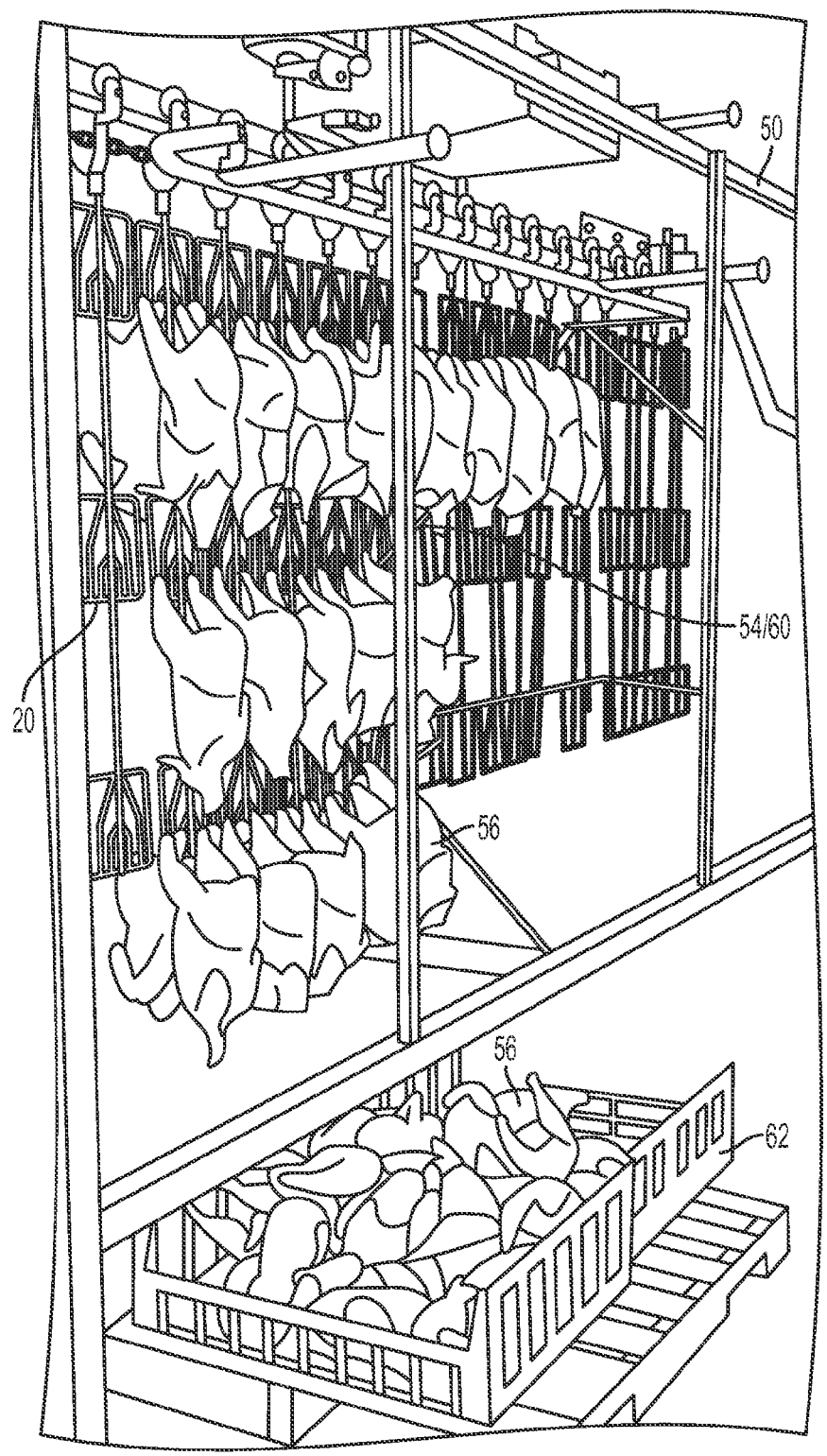
FIG. 6 depicts another perspective view of the conveyor and poultry shackles of FIGS. 2-3, shown with the whole birds in an unloading area.

Referring to FIG. 6, the conveyor 50 can include an unloader 54 adapted to eject the birds 56 from the shackles 20. For example, the unloader 54 can include one or more inclined surfaces 58 located in the path of the shackles 20. For example, the unloader 54 can comprise one or more rods 60, ledges, or other structures that raise the birds 56 up with respect to the shackles 20, causing the birds' feet or drumstick knuckles to raise from the lower portion of the respective foot loops to the upper portion of the respective foot loops, allowing the birds 56 to release from the shackles 20, separating entirely form that conveying device. Crates 62 or other devices can be provided to collect the birds 56 or conveyors can be used to transport the birds to the next processing area.

While various embodiments of the present invention have been described above, it should be understood that they have been presented by way of example only, and not limitation. Thus, the breadth and scope of the present invention should not be limited by any of the above-described embodiments, but should instead be defined only in accordance with the following claims and their equivalents.

What is claimed:

1. A multi-bird poultry shackle, comprising:
a stanchion having a connection point adapted to couple to a conveyor;
a first shackle coupled to the stanchion, the first shackle comprising a first pair of leg loops adapted to hold the legs of a first bird, and a second pair of leg loops adapted to hold the legs of a second bird;
a second shackle coupled to the stanchion below the first shackle, the second shackle comprising a third pair of leg loops adapted to hold the legs of a third bird, and a fourth pair of leg loops adapted to hold the legs of a fourth bird; and a third shackle coupled to the stanchion below the second shackle, the third shackle comprising a fifth pair of leg loops adapted to hold the legs of a fifth bird, and a sixth pair of leg loops adapted to hold the legs of a sixth bird.

2. The multi-bird poultry shackle of claim 1, wherein the leg loops alternate so that the legs of the bird go into the first and third leg loops on one side of the shackle and second and fourth leg loops on the opposite side of the shackle.

3. The multi-bird shackle of claim 1, wherein the third and fourth pairs of leg loops follow the same pattern as the first and second pairs of leg loops.

4. The multi-bird poultry shackle of claim 3, follow the fifth and sixth pairs of leg loops follow the same pattern as the third and fourth pairs of leg loops.

5. The multi-bird poultry shackle of claim 1, wherein the first shackle comprises a metal framework, and each leg loop is defined by a pair of adjacent metal rods.

6. The multi-bird poultry shackle of claim 1, wherein each leg loop comprises a lower portion having a width sufficiently narrow to retain a bird's paw or drumstick knuckle, and an upper portion having a width sufficiently wide to release a bird's paw or drumstick knuckle.

7. The multi-bird poultry shackle of claim 6, wherein the lower portion of each leg loop has a width between about 3/8" and about 1 1/4", and the upper portion of each leg loop has a width between about 1" and about 4".

8. A conveyor including a plurality of multi-bird poultry shackles of claim 1, the conveyor comprising a conveyor chain that moves the plurality of multi-bird shackles.

9. The conveyor of claim 8, wherein the conveyor includes a plurality of turns equal to or less than about 180 degrees.

10. The conveyor of claim 9, wherein each of the plurality of turns has a diameter of between about 1 foot to about 2.5 feet.

11. The conveyor of claim 10, further comprising an unloader adapted to eject the birds from the first, second, and third shackles.

12. The conveyor of claim 11, wherein the unloader comprises an inclined surface located along the conveyor, the inclined surface adapted to lift the birds out of the shackles.

13. A method of conveying poultry carcasses, comprising:

providing a conveyor including a plurality of multi-bird shackles, each multi-bird shackle including a first shackle comprising a first pair of leg loops and a second pair of leg loops, a second shackle located below the first shackle, the second shackle including a third pair of leg loops and a fourth pair of leg loops, and a third shackle located below the second shackle, the second shackle including fifth pair of leg loops and a sixth pair of leg loops;

securing the feet or drumstick knuckles of a first bird in the first and third leg loops;

securing the feet or drumstick knuckles of a second bird in the second and fourth leg loops, the second bird located on the opposite side of the first shackle from the first bird;

securing the feet or drumstick knuckles of a third bird in a third set of leg loops, the third bird located below the first bird;

securing the feet of a fourth bird in a fourth set of leg loops, the fourth bird located on the opposite side of the second shackle from the third bird;

securing the feet or drumstick knuckles of a fifth bird in a fifth pair of leg loops located on a third shackle below the second shackle;

securing the feet or drumstick knuckles of a sixth bird in a sixth pair of leg loops located on the third shackle, wherein the sixth bird is located on the opposite side of the third shackle from the fifth bird; and circulating the conveyor.

14. The method of claim 13, further comprising:

conveying the plurality of shackles around at least one turn of 180 degrees or less than about 180 degrees.

15. The method of claim 14, wherein the at least one turn has a diameter of between about 1 foot to about 2.5 feet.

16. The method of claim 13, further comprising:

unloading the birds from the shackles using an unloader.

17. The method of claim 16, wherein unloading the birds comprises contacting the birds with an inclined surface and lifting the birds from the shackles.

* * * * *